May 24, 1949.    G. D. PRINGLE    2,470,863
RAKE CLEANER
Filed June 28, 1948
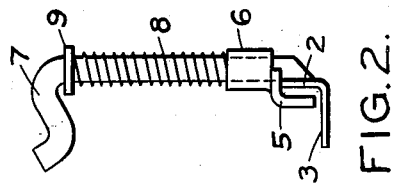
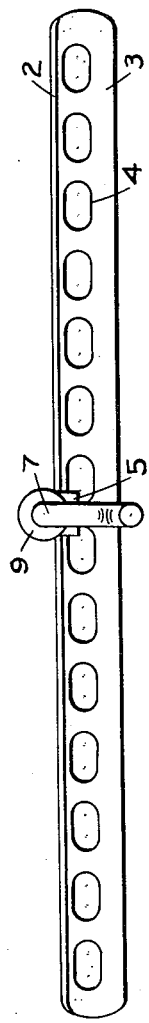
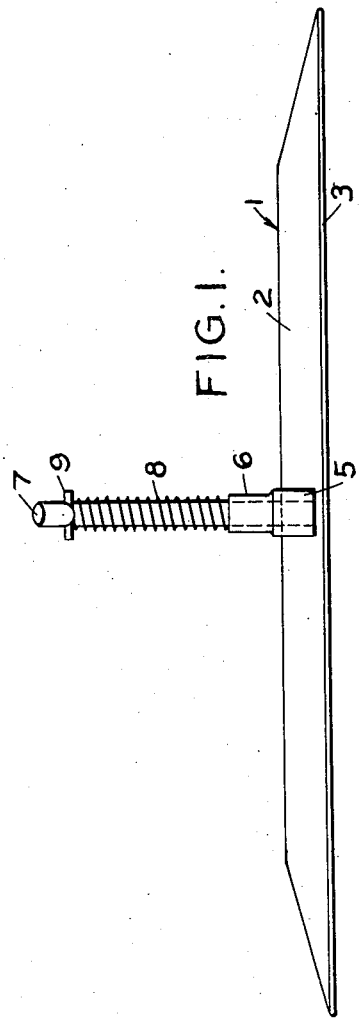
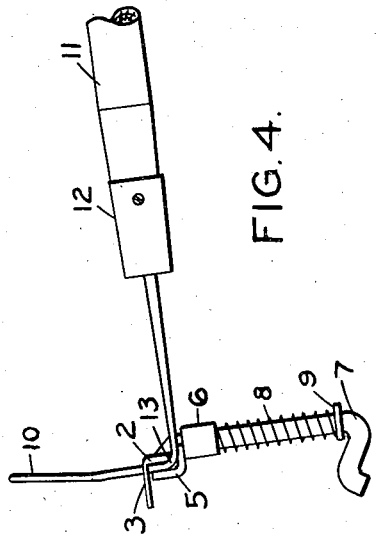
INVENTOR.
Glenn D. Pringle.
BY *Samuel H. Davis*
ATTORNEY.

Patented May 24, 1949

2,470,863

UNITED STATES PATENT OFFICE 2,470,863

RAKE CLEANER

Glenn D. Pringle, Lansing, Mich.

Application June 28, 1948, Serial No. 35,557

1 Claim. (Cl. 56—400.09)

This invention relates to rake cleaners, is particularly concerned with garden rake cleaners, and is more particularly concerned with a garden rake cleaner adaptable for attachment to a garden rake and the use of which provides means for removing weeds, debris, and like materials which accumulate to the prongs of the rake.

In the use of a garden rake for spreading earth or for gathering leaves and stubble on a lawn there is a great tendency for the said leaves and stubble to be attached to the prongs and thereby interfering with the use of the rake. When the rake is used in a garden to spread the earth, weed roots present therein will attach themselves to the prongs and unless the same are removed the efficiency of the workmanship is greatly diminished. To remove such debris by hand is time consuming and further impairs the efficiency of the workmanship.

In the prior art there are devices which are designed for attachment to the rake and which are intended for use in removing accumulated debris from the prongs of the rake. One such device is disclosed in U. S. Patent 1,780,688, and another nearly identical device is disclosed in U. S. Patent 479,940. Each of these are cumbersome of use and due to the type of spring employed for raising the device upwardly toward the bar of the rake causes the said spring to rapidly deteriorate at a point farthest away from the said bar. I have spent considerable time in research on such devices and have attempted to use those above-mentioned and have found them greatly inadequate.

It is therefore an object of this invention to provide a garden rake cleaner. It is a further object of this invention to provide a garden rake cleaner which is very simple of use. It is a further object to provide a garden rake cleaner having efficient means for returning the cleaning plate to the bar of the rake. It is a further object to provide a garden rake cleaner which is simple of attachment to a garden rake, and simple of detachment from a garden rake.

I have now discovered and invented in combination with a garden rake, a rake cleaner comprising a sheet metal angle bar, the angle of the said bar being a right angle, a pair of flanges extending from points common to each other, one of the said flanges having a plurality of holes therethrough, the said holes adapted for projection therethrough the said first flange by the prongs of a rake, the second flange having attached midway thereto a rod, the said rod extending perpendicularly to the edge thereof the said second flange, a hollow cylindrical member slidably attached to the said rod, the said cylindrical member having a retainer member securely attached thereto, the said retainer member adapted for conforming to a bar of a rake, and adapted for retaining the said garden rake cleaner attached to the said rake, a spiral spring, a spring stop, the said spring stop being secured to the said rod, the said spring being projected by the said rod, and being located between the said retainer member and the said spring stop, the said spring stop adapted for retaining the said spring around the said rod between the said stop and the said hollow cylindrical member, a portion of an end of the said rod being substantially bent and the said bent portion adapted for pressing the same against the earth, forcing the said cylindrical member downwardly, forcing the said angle bar downwardly, and scraping debris from the prongs of the rake, and the said spiral spring adapted for returning the said angle bar to its original position when the pressure upon the said bent portion of the said rod is released, and I am now able to avoid the disadvantages of the prior art and am able readily to accomplish the objects set forth.

While some of the more outstanding features, and advantages of this invention have been hereinbefore indicated, others will become apparent from the following disclosures, taken in conjunction with the accompanying drawing, in which:

Fig. 1 is a front view of the garden rake cleaner.

Fig. 2 is a right side view of the same.

Fig. 3 is a top view of the same.

Fig. 4 is a right side view of the same shown attached to a garden rake.

The metal angle bar 1 has two flanges at right angles to each other and extend from points common to each other. The flange 3 has a plurality of holes 4 located therealong to conform with the prongs 10 of a garden rake. The flange 2 of the angle bar 1 has securely attached thereto, and substantially midway from its ends, a rod 7. The lower end of the said rod 7 is welded to the said flange 2. The hollow cylindrical member 6 is slidably attached to the rod 7. The retainer member 5 is welded to the said cylindrical member 6. The spring stop 9 is welded to the upper portion of the rod 7 adjacent to a bent portion of the said rod 7. The spiral spring 8 is held by the rod 7, between the spring stop 9 and the hollow cylindrical member 6.

In the Fig. 4 is shown the garden rake cleaner attached to a garden rake. The retainer member 5 conforms with the outer portion of the bar 13 of the rake and is held firmly against the said bar 13 by the pressure of the spring 8 on one side, and the angle bar 1 on the other side of the said rake bar 13.

The garden rake cleaner of my invention is attached to the rake by inserting the prongs of the rake through the holes in the flange 3, by raising the retainer member 5 upwardly against the spring 8, and then allowing the said retainer member 5 to snap over the bar 13 of the rake.

After the rake has been in use for a while and the prongs have accumulated a quantity of debris and it is necessary to remove the said debris, the rake is turned over by the handle 11 and pressure is applied on the bent portion of the rod 7. The rod 7 passes through the hollow cylindrical rod 6, and forces the angle bar 1 upwardly toward the ends of the prongs of the rake, and removes the debris therefrom.

Having clearly set forth the construction, utility and advantages of my invention I wish particularly to state that it will be apparent that changes in the details of the construction and arrangement of the various members of the invention may be resorted to without departing from the spirit and scope of the invention as hereinafter claimed.

I claim:

In combination with a garden rake, a rake cleaner comprising a sheet metal angle bar, the angle of the said bar being a right angle, a pair of flanges extending from points common to each other, one of the said flanges having a plurality of holes therethrough, the said holes adapted for projection therethrough the said first flange by the prongs of a rake, the second flange having attached midway thereto a rod, the said rod extending perpendicularly to the edge thereof the said second flange, a hollow cylindrical member slidably attached to the said rod, the said cylindrical member having a retainer member securely attached thereto, the said retainer member adapted for conforming to a bar of a rake, and adapted for retaining the said garden rake cleaner attached to the said rake, a spiral spring, a spring stop, the said spring stop being secured to the said rod, the said spring being projected by the said rod, and being located between the said retainer member and the said spring stop, the said spring stop adapted for retaining the said spring around the said rod between the said stop and the said hollow cylindrical member, a portion of an end of the said rod being substantially bent and the said bent portion adapted for pressing the same against the earth, forcing the said cylindrical member downwardly, forcing the said angle bar downwardly, and scraping debris from the prongs of the rake, and the said spiral spring adapted for returning the said angle bar to its original position when the pressure upon the said bent portion of the said rod is released.

GLENN D. PRINGLE.

No references cited.